Figure 1:
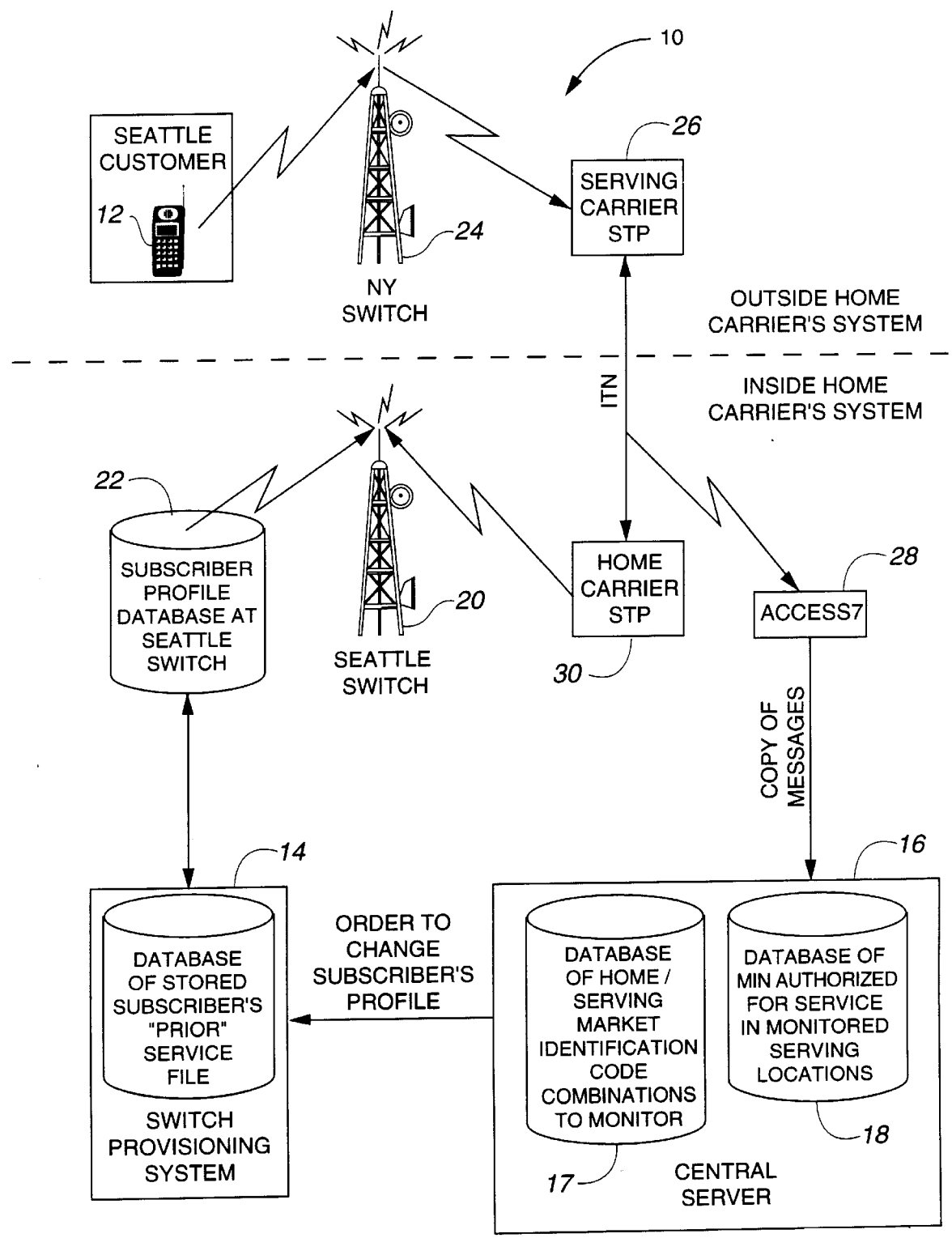

United States Patent [19]
Josenhans et al.

[11] Patent Number: 5,953,653
[45] Date of Patent: Sep. 14, 1999

[54] METHOD AND SYSTEM FOR PREVENTING MOBILE ROAMING FRAUD

[75] Inventors: Charles A. Josenhans, Redmond; Shawn M. Waliser, Snoqualmie Pass; Joseph B. Moore, Lynnwood, all of Wash.

[73] Assignees: MediaOne Group, Inc., Englewood; U S West, Inc., Denver, both of Colo.

[21] Appl. No.: 08/789,927

[22] Filed: Jan. 28, 1997

[51] Int. Cl.$^6$ .................................................. H04M 1/66
[52] U.S. Cl. ........................................ 455/410; 455/414
[58] Field of Search ................................... 455/410, 417, 455/411, 432, 435, 433, 414, 551, 552; 380/20, 23; 379/196, 197, 188

[56] References Cited

U.S. PATENT DOCUMENTS

| | | | |
|---|---|---|---|
| 5,335,265 | 8/1994 | Cooper et al. | 455/410 |
| 5,335,278 | 8/1994 | Matchett et al. | 380/23 |
| 5,448,760 | 9/1995 | Frederick | 433/410 |
| 5,463,681 | 10/1995 | Vaois et al. | 379/189 |
| 5,495,521 | 2/1996 | Rangachar | 379/93.04 |
| 5,517,555 | 5/1996 | Amadon et al. | 455/408 |
| 5,555,551 | 9/1996 | Rudokas et al. | 379/59 |
| 5,588,042 | 12/1996 | Comer | 455/413 |
| 5,627,886 | 5/1997 | Bowman | 379/111 |
| 5,706,338 | 1/1998 | Relyea et al. | 379/189 |
| 5,713,072 | 1/1998 | Marth et al. | 455/33.1 |
| 5,799,249 | 8/1998 | Kennedy, III et al. | 455/411 |

*Primary Examiner*—Reinhard J. Eisenzopf
*Assistant Examiner*—Charles N. Appiah
*Attorney, Agent, or Firm*—Brooks & Kushman, PC

[57] ABSTRACT

A method and system for detecting and preventing a fraudulent request for mobile telephone service to be provided to a mobile subscriber by one of a plurality of serving carrier mobile networks in one of a plurality of roaming markets subject to fraud includes a first database storing home/serving market identification codes and a second database storing authorized subscriber identification data. A monitoring device monitors communication data in response to a power-on signal transmitted by the mobile telephone unit. A central server then determines if the subscriber is authorized to receive service in the roaming market based on the communication data, the home/serving market identification codes stored in the first database, and the authorized subscriber identification data stored in the second database. The home carrier mobile network can then prevent the subscriber from obtaining service in the roaming market or any other market thereafter if the subscriber is not authorized to receive service in that roaming market by updating data stored in a subscriber profile database to reflect the subscriber must be routed to customer service upon placing an outgoing call following the power-on signal.

14 Claims, 3 Drawing Sheets

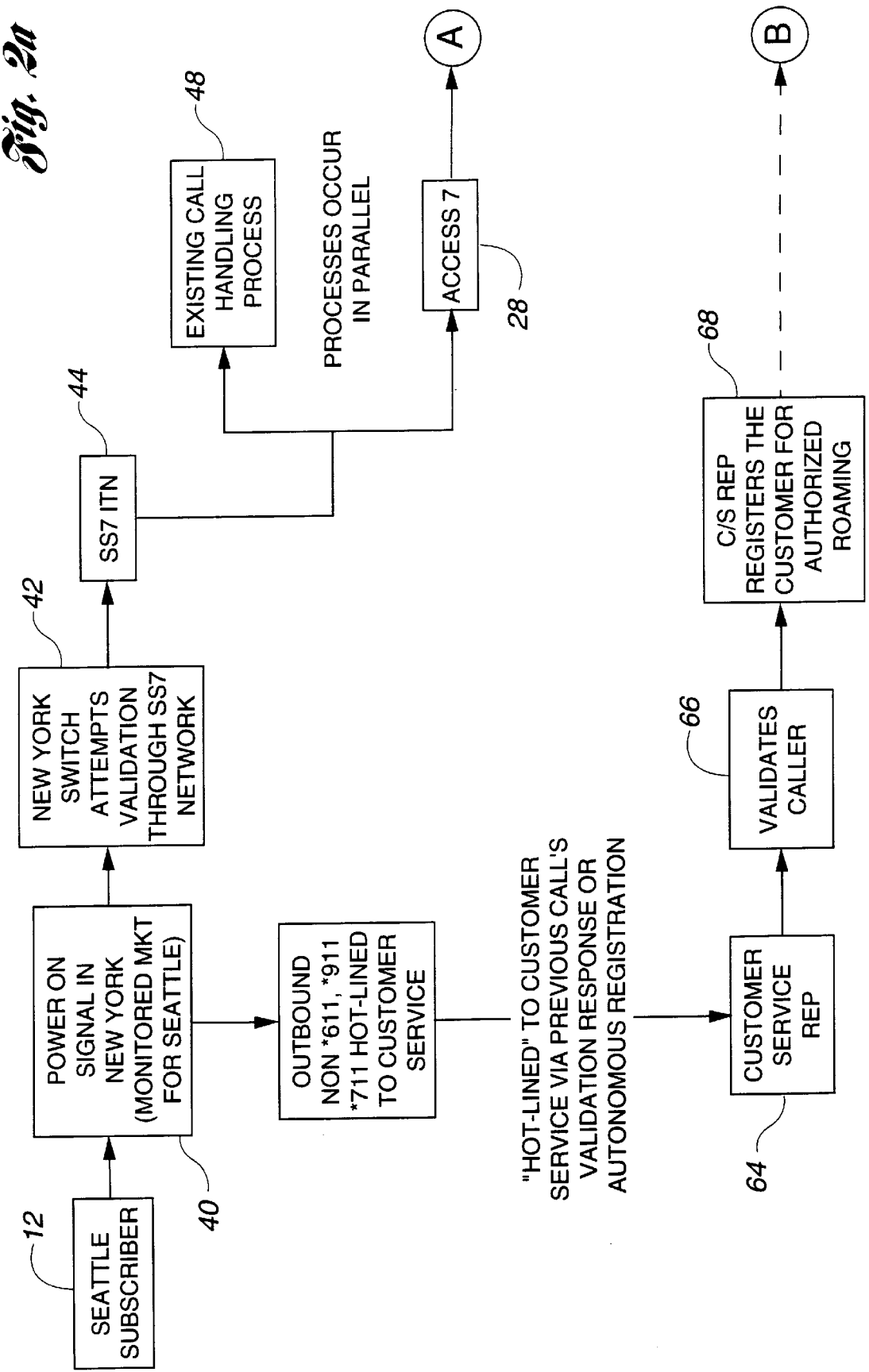

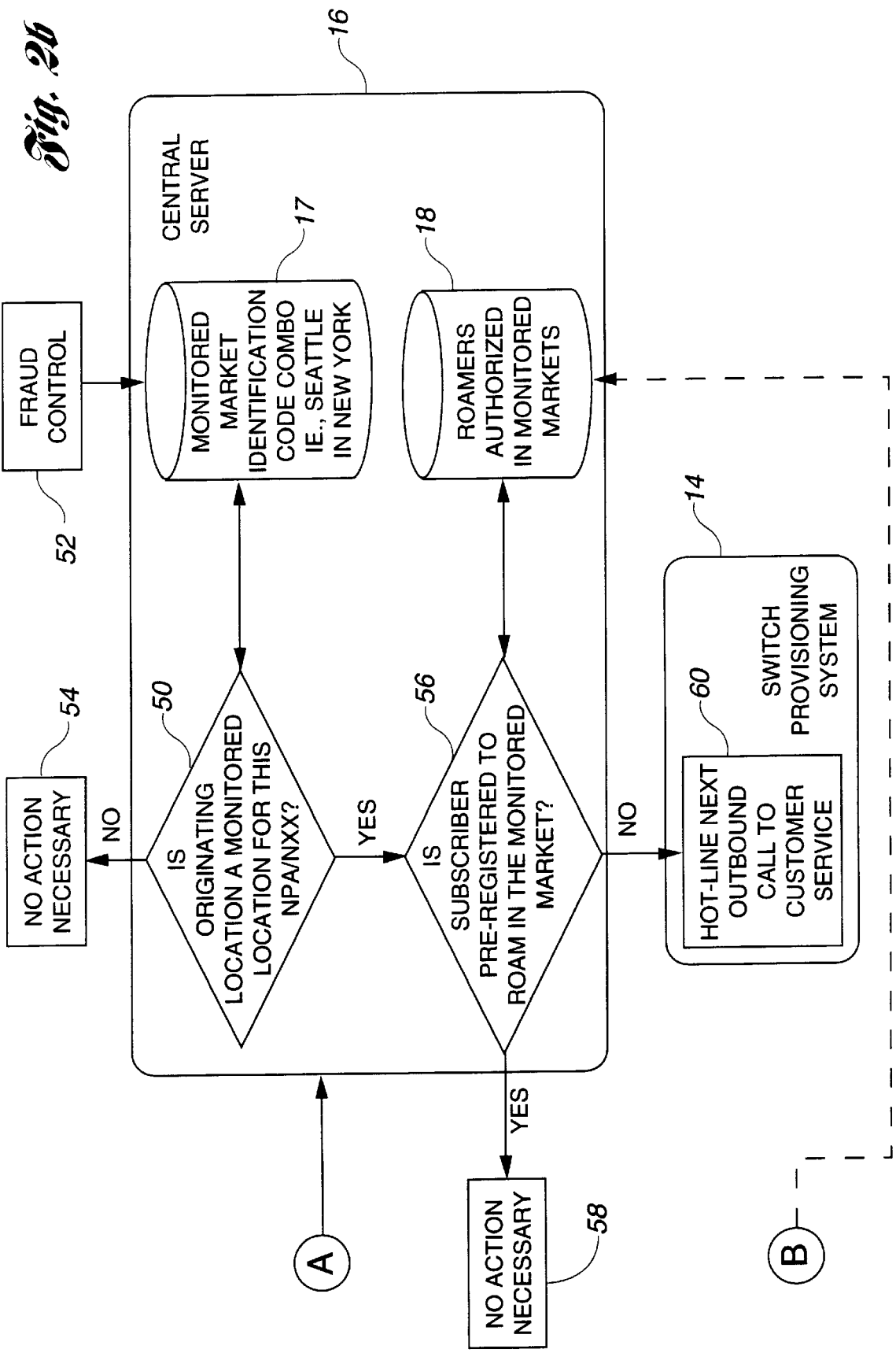

METHOD AND SYSTEM FOR PREVENTING MOBILE ROAMING FRAUD

TECHNICAL FIELD

This invention relates to methods and systems for detecting and preventing mobile roaming fraud.

BACKGROUND ART

Cellular mobile telephone services are currently one of the most rapidly expanding types of communication services. They have been in operation in the continental United States for nearly a decade and have been offered in many other parts of the world for several years.

Whereas cellular mobile telephone services were once limited to relatively small geographic home areas, they have since evolved to permit expanded service across state and national boundaries through "roaming" agreements. This expansion has served the commercial objectives of mobile telephone service providers by providing roaming mobile subscribers the ability to freely and quickly automatically originate and receive telephone calls from other fixed or mobile stations in the network. At the same time, however, this service expansion has also placed service providers at risk of theft due to the inherent drawbacks in conventional validation schemes.

Consider, for example, cellular mobile telephone systems which provide services to cellular sub-scriber who travel or "roam" away from their home markets. Before initiating cellular service to the roaming user, a serving carrier validates the subscriber's Mobile Identification Number (MIN) and Electronic Serial Number (ESN) to verify that these numbers are in good standing. More specifically, when a subscriber first enters a roaming market or "powers up" her cellular telephone in a roaming market, her unique MIN and ESN are transmitted to a serving carrier of the serving market. These numbers identify to the serving carrier that the subscriber whose access codes have been transmitted is not a local subscriber. Utilizing an IS-41 network, the server therefore requests registration data from the subscriber's home carrier which corresponds to the received MIN/ESN. This registration data is delivered via the IS-41 network back to the serving market to provide information to the serving carrier regarding the subscriber's call features and restrictions and to enable the carrier to make a decision whether or not to provide service.

As readily seen, the system validates that a particular MIN/ESN is entitled to roaming privileges. It fails, however, to determine whether the specific user or, for that matter, the phone itself are in fact legitimate. In short, prior art mobile telephone systems validate access codes only—not subscribers. Once the transmitted access codes have been verified, the prior art systems merely assume that the true subscriber is the user who is requesting access in the roaming market.

Unfortunately, in practice, this assumption has proven false. In recent years, there has been a dramatic increase in roamer "clone" fraud. That is, unscrupulous users who improperly obtain the access codes of legitimate users and thus "clone" their identities for the purpose of committing fraud on the service provider.

One known system for preventing and detecting cloning fraud is provided by GTE Telecommunication Services, Inc. (GTE TSI). GTE TSI provides a clearing-house validation service by maintaining a "positive" database of valid subscriber MIN/ESNs and a "negative" database of invalid subscriber MIN/ESNs. When a call is received by the GTE TSI system, a lookup is performed against the positive and negative databases to determine if the MIN/ESN combination is valid. If not, the MIN/ESN is entered into the negative database. This system, however, only validates MIN/ESN combinations, and does not know which portion of the combination is invalid. Furthermore, this system only validates data after a call is placed, not before.

Another known system for preventing cellular fraud is disclosed in U.S. Pat. No. 5,335,278, issued to Matchett et al. This system is a refinement of the GTE TSI-type system described above in which each cellular network carrier transmits its positive and negative database to a central source. The central source than broadcasts or transmits this information to each cellular network carrier so that each cellular network carrier can determine if a roamer request for service is from a valid, currently authorized mobile unit before cellular telephone service is provided by the visited cellular network. This system, however, is a paid-for service in which the service provider performs the validation service for the home cellular carrier for a fee.

Another known system utilized in both the IS-41 network and the X.25 network comprises a clearing-house that provides the home carrier with the capability of ensuring that their roaming MINs are being used by legitimate subscribers. When a roaming caller attempts to register, the serving market switch sends a request to the home carrier switch to determine if the MIN/ESN is valid and what kind of service they have subscribed to. At the same time, the clearinghouse monitors the home carrier and serving market identification codes to determine if this home carrier/serving market combination needs to be monitored for the home carrier. If so, the clearinghouse then determines if the MIN/ESN is valid. If the MIN/ESN is not valid, then the clearing-house directs the serving carrier to forward all calls from the MIN/ESN to the clearinghouse while they are in the serving market. This system requires the customer to be forwarded to an unknown third party service, rather than their own customer service. Furthermore, this system monitors only the home carrier/serving market combinations chosen by the home carrier. Therefore, if a user does not satisfy the requirements of customer service, the user can Roam to another serving location that the clearinghouse has not been instructed to monitor.

Thus, there exists a need for a simple, fast, and reliable system for detecting and preventing mobile roaming fraud by any mobile carrier at all times.

DISCLOSURE OF THE INVENTION

It is thus a general object of the present invention to provide a method and system for allowing a home carrier to verify that their roaming MINs are being used by legitimate subscribers.

It is a further object of the present invention to provide a method and system for immediately authorizing mobile service to a legitimate roaming subscriber.

In carrying out the above object and other objects, features, and advantages of the present invention, a method is provided for detecting and preventing mobile roaming fraud in one of a plurality of roaming markets. The method includes the steps of storing home/serving market identification codes in a first database and storing authorized subscriber identification data in a second database. The method also includes the step of receiving a power-on signal from a mobile telephone unit. Still further, the method includes the step of determining if the subscriber is authorized to receive service in one of the plurality of roaming markets based on the power-on signal, the home/serving market identification codes stored in the first database, and the authorized subscriber identification data stored in the second database. If the subscriber is not authorized to receive service in the roaming market, the method concludes with the step of updating the data stored in the service profile database to indicate the subscriber is not authorized to receive mobile service in the one of the plurality of roaming markets.

In further carrying out the above object and other objects, features, and advantages of the present invention, a system is also provided for carrying out the steps of the above described method. The system includes a first database for storing home/serving market identification codes and a second database for storing authorized subscriber identification data. The system also includes a monitoring device for monitoring communication data in response to a power-on signal transmitted by the mobile telephone unit. Still further, the system includes a central server for determining if the subscriber is authorized to receive service in one of a plurality of roaming markets based on the communication data, the home/serving market identification codes stored in the first database, and the authorized subscriber identification data stored in the second database. Finally, the system includes a home carrier mobile network for updating the data stored in the service profile database to indicate the subscriber is not authorized to receive mobile service in the one of the plurality of roaming markets.

The above objects and other objects, features and advantages of the present invention are readily apparent from the following detailed description of the best mode for carrying out the invention when taken in connection with the accompanying drawings.

BREIF DESCRIPTION OF THE DRAWINGS

FIG. 1 is a schematic diagram of the preferred embodiment of the present invention; and FIGS. 2A–2B are flow diagrams illustrating the general sequence of steps associated with the operation of the present invention.

BEST MODES FOR CARRYING OUT THE INVENTION

A mobile network, such as a wireless or cellular network, experiences roaming fraud when the personal access codes, i.e. MIN/ESN, of a legitimate subscriber are "scanned," or obtained through other improper means by fraudulent users, to be used in markets with extremely high fraud rates like New York or Los Angeles. This typically follows distinctive patterns, for example, Phoenix numbers used in Los Angeles or Seattle numbers used in New York.

The present invention addresses this problem by monitoring calls by a subscriber in a "roaming market," i.e., a market subject to fraud, to determine if the subscriber is authorized to roam there prior to providing service to the subscriber.

Turning now to FIG. 1, there is shown a schematic diagram of the system of the present invention, denoted generally by reference numeral 10. In the preferred embodiment, a cellular system is described, however, the present invention may be used in conjunction with any mobile or wireless network. In operation, a subscriber of cellular service is assigned dedicated access codes such as, for example, a MIN and ESN for his/her mobile telephone unit 12. When the subscriber signs up for cellular service, a switch provisioning system 14 of the cellular network stores data defining the subscriber's service profile, such as data indicating that the MIN is allowed to originate calls while roaming, the MIN can dial internationally, automatic call delivery is activated, etc.

The system 10 also includes a central server 16 having a first database 17 and a second database 18. The first database 17 includes home/serving market identification code combinations requiring monitoring in order to prevent roaming fraud. One such identification code may be a point code, which is a 9-digit code that uniquely identifies a point in the Signaling System 7 (SS7) network. Another such code may be a component of a subscriber's phone number, such as the six-digit telephone number prefix. For each roaming market in which customer numbers are used fraudulently, an originating market identification code is specified in combination with the telephone number's home market identification code. For example, Seattle-based cellular telephone numbers may be subject to fraudulent use in New York. Thus, the identification codes corresponding to Seattle/New York are stored in the first database 17.

The second database 18 is a database of MINs authorized for service in the monitored serving locations, or "bad" markets. Subscribers become authorized on an as-needed basis, as will be described in greater detail below. Alternatively, subscribers with a history of roaming to the monitored market may be pre-registered. For example, a subscriber who has been to the monitored market in the prior 6 months may be pre-registered and the present invention will not effect their service.

Still referring to FIG. 1, the system 10 further includes at least one home carrier Mobile Switching Center (MSC) 20 containing a subscriber profile database 22 for the home carrier MSC 20. Alternatively, the subscriber profile database 22 may be centrally located, such as at an external Home Location Register (HLR) (not shown).

The present invention will be described in conjunction with an SS7 network, however, other networks, such as the X.25 network, are also suitable for the present invention. The prevention of roaming fraud is accomplished by monitoring the SS7 messages that are transmitted from a MSC local to the mobile telephone unit 12. When the mobile telephone unit 12 first powers on, a power-on signal communicates with a local MSC 24 which performs a registration and validation process. The local MSC 24, in turn, communicates with a local Signal Transfer Point (STP), or the serving carrier STP, 26. The serving carrier STP 26 then transmits a registration/validation request out to the SS7 Intelligent Network (ITN).

All SS7 roaming transactions transit through a monitoring device 28, such as a Hewlett Packard AcceSS7 (TM) protocol analyzer or any other suitable analyzer, located at each STP location. The monitoring message protocol device 28 passively monitors the SS7 network and sends a copy of all registration/validation requests to the central server 16 for evaluation. The central server 16 receives the SS7 message, including MIN, point code of the serving market, and other IS-41 message data, and compares the home/serving market identification code combination with the first database 17. If the serving market identification code is a monitored location for the home market identification code, the subscriber's MIN is compared with the authorized MINs in the second database 18. Otherwise, no action is taken. If the MIN is not authorized to roam in the serving or monitored market, a message is sent to the switch provisioning system 14 instructing the switch provisioning system 14 to update the subscriber profile database 22.

At the same time that the SS7 message is monitored and processed, a home carrier STP 30, i.e., the STP of the home carrier cellular network to which the subscriber subscribes to, receives the registration/validation request from the serving carrier STP 26 and identifies which home carrier MSC 20 to send the message to. The home carrier MSC 20 then checks the subscriber profile database 22 to determine if the subscriber is valid. If so, a validation response is sent back to the serving carrier MSC 24, including the subscriber's service profile. If not, the subscriber is "hotlined" to a customer service representative for verification. This is accomplished by changing the subscriber service profile to "call route" any outgoing calls, except 911, 611, and 711, to a number specified by the user of the system. The preferred embodiment call routes to a toll free number at the home carrier's customer service. Incoming calls are not affected. Thus, the next time a call is placed, whether in the home market or a serving market, the user is hotlined to customer service, regardless of the current location of the user, so that the user can be identified as the valid subscriber.

Upon receiving a request to update the subscriber's profile, the switch provisioning system 14 first copies key subscriber profile data items from the subscriber profile database 22 and then updates the subscriber profile database 22. The subscriber's prior service profile is then stored for use when the "hot-lined" state expires.

Turning now to FIGS. 2A–2B, there is shown flow diagrams illustrating the general sequence of steps associated with the operation of the present invention. For purposes of illustration only, the operation of the present invention will be described utilizing a subscriber based in Seattle who has roamed into New York. When the mobile telephone unit 12 assigned to the subscriber is turned on in New York, a power-on signal is generated, as shown at block 40.

The New York switch, i.e., the local MSC 24, attempts validation through the SS7 network via an SS7 message over the SS7 ITN, as shown at blocks 42 and 44, respectively. The SS7 message includes, but is not limited to, subscriber identification data, home market identification code data and serving market identification code data. The transmitted SS7 message is monitored by the monitoring device 28. In addition, the fraud detection and prevention method of the present invention occurs in parallel with existing call handling processes, as shown at block 48.

Next, the method determines whether the originating location in which the telephone mobile unit 12 is located in is a monitored location for the given Numbering Plan Area/NXX (NPA/NXX), as shown at conditional block 60. The NPA is a code corresponding to the 3-digit code that designates one of the numbering plan areas in the North American Numbering Plan for direct distance dialing and NXX is a numeric identification code identifying local central offices where N represents any number from 2 through 9 and X any number from 0 to 9. The originating location, or serving market, is determined to be a monitored location by comparing the home market identification code data and the serving market identification code data as monitored by the monitoring device 28 with the monitored market identification code combinations stored in the first database 17. The monitored market identification code combinations are entered into the first database by a fraud control entity 52 based on historical data.

If the serving market is not a monitored market, no action is taken, as shown at block 54. If the serving market is a monitored market, then a determination is made as to whether or not the subscriber is pre-registered to roam in the serving market, as shown at conditional block 56. This is done by comparing the subscriber identification data with the authorized MINs stored in the second database 18.

If the subscriber is authorized to roam in the serving market, no action is taken, as shown at block 58. If the subscriber is not authorized to roam in the serving market, the subscriber is "hotlined" to customer service during their next outbound call, as shown at block 60.

Once the fraud detection and prevention method of the present invention has occurred, the next time the subscriber places a call, the subscriber is "hotlined" to customer service, as shown at block 62. That is, the subscriber will be routed to Customer Service directly. An exception to this step can be allowed for 611, 711, and/or 911 calls.

Upon being "hotlined" to customer service, a customer service representative 64 validates the caller, as shown at block 66. The caller, or subscriber, validates himself or herself by providing predetermined identification data, such as a PIN, social security number, etc. Upon validating himself or herself, the customer service representative 64 registers the subscriber for authorized roaming, as shown at block 68. This is accomplished by updating the second database to include the subscriber as being authorized to roam in this monitored market.

The present invention results in minimum imposition to selected subscribers, while placing control for the use of their number in the subscriber's hands. Fraudulent use of cellular service is prevented before it occurs, or after only one call, thus greatly minimizing losses due to fraud.

While the best modes for carrying out the invention have been described in detail, those familiar with the art to which this invention relates will recognize various alternative designs and embodiments for practicing the invention as defined by the following claims.

What is claimed is:

1. For use in a mobile telephone system including a home carrier mobile network providing mobile telephone services to a mobile subscriber having a mobile telephone unit assigned thereto and further including a service profile database for storing data to be verified by a serving carrier mobile network, a method for detecting and preventing a fraudulent request for mobile telephone service to be provided to the mobile subscriber by one of a plurality of serving networks, the method comprising:

storing home/serving market identification code combinations in a first database identifying at least one of the plurality of serving networks subject to fraud;

storing authorized subscriber identification data in a second database identifying authorized serving networks associated with the mobile subscriber;

receiving a power-on signal from the mobile telephone unit when the mobile telephone unit is in one of the plurality of serving networks;

determining if the subscriber is authorized to receive mobile service in the serving network based on the power-on signal, the home/serving market identification code combinations stored in the first database, and the authorized subscriber identification data stored in the second database; and if the subscriber is not authorized to receive service in the serving network, updating the data stored in the service profile database to indicate the subscriber is not authorized to receive mobile service in the serving network and must be routed to a customer service representative for validation immediately upon placing an outgoing call following the power-on signal.

2. The method as recited in claim 1 wherein the power-on signal includes subscriber identification data, a home market identification code and a serving market identification code and wherein determining if the subscriber is authorized comprises:

comparing the home market identification code and the serving market identification code of the signal with the stored home/serving market identification code combinations to determine if the power-on signal is originating in one of the plurality of serving networks subject to fraud;

if the power-on signal is originating in one of the plurality of serving networks subject to fraud, comparing the subscriber identification data of the signal with the stored authorized subscriber identification data to determine if the subscriber is authorized to receive service in the serving network.

3. The method as recited in claim 1 further comprising:

receiving an outgoing call from the subscriber having identification data;

comparing the identification data with the data stored in the service profile database; and routing the subscriber to a customer service representative based on the comparison.

4. The method as recited in claim 3 wherein routing the subscriber to the customer service representative includes verifying the subscriber is authorized to access the mobile telephone unit.

5. In a mobile telephone system including a home carrier mobile network providing mobile telephone services to a mobile subscriber having a mobile telephone unit assigned thereto, and further including a service profile database for storing data to be verified by a serving carrier mobile network, a system for detecting and preventing a fraudulent request for mobile telephone service to be provided to the mobile subscriber by one of a plurality of serving networks, the system comprising:

a first database for storing home/serving market identification code combinations identifying at least one of the plurality of serving networks subject to fraud;

a second database for storing authorized subscriber identification data identifying authorized serving networks associated with the mobile subscriber;

a monitoring device for monitoring communication data in response to a power-on signal transmitted by the mobile telephone unit when the mobile telephone unit is in one of the plurality of serving networks;

a central server for determining if the subscriber is authorized to receive mobile service in the serving network based on the communication data, the home/serving market identification code combinations stored in the first database, and the authorized subscriber identification data stored in the second database; and a switch provisioning system for updating the data stored in the service profile database to indicate the subscriber is not authorized to receive mobile service in the serving network and must be routed to a customer service representative for validation immediately upon placing an outgoing call following the power-on signal.

6. The system as recited in claim 5 wherein the communication data includes subscriber identification data, a home market identification code and a serving market identification code and wherein the central server comprises:

a first comparator circuit for comparing the home market identification code and the serving market identification code of the communication data with the stored home/serving market identification code combinations to determine if the power-on signal is originating in one of the plurality of serving networks subject to fraud;

a second comparator circuit for comparing the subscriber identification data of the communication data with the stored authorized subscriber identification data to determine if the subscriber is authorized to receive service in the serving network if the power-on signal is originating in one of the plurality of serving networks subject to fraud.

7. The system as recited in claim 5 wherein the system further comprises:

a local switch for receiving an outgoing call from the subscriber having identification data;

the one of the plurality of switches for comparing the identification data with the service profile database and routing the subscriber to a customer service representative of the home carrier mobile network based on the comparison.

8. The system as recited in claim 7 wherein the customer service representative further verifies the subscriber is authorized to access the mobile telephone unit.

9. The system as recited in claim 5 wherein the monitoring device is an IS-41 network message protocol analyzer.

10. The system as recited in claim 9 wherein the IS-41 network message protocol analyzer is an AcceSS7 device.

11. The system as recited in claim 5 wherein the home/serving market identification code combinations are point code combinations.

12. The system as recited in claim 5 wherein the home/serving market identification code combinations include telephone number prefixes.

13. The system as recited in claim 5 wherein the subscriber profile database is centrally located.

14. The system as recited in claim 5 wherein the mobile telephone system includes a plurality of switches and wherein the subscriber profile database is located at each of the plurality of switches.

* * * * *